(12) United States Patent
Gladden et al.

(10) Patent No.: US 6,324,848 B1
(45) Date of Patent: Dec. 4, 2001

(54) TURBOCHARGER SYSTEM TO INHIBIT SURGE IN A MULTI-STAGE COMPRESSOR

(75) Inventors: John R. Gladden; Min Wu, both of Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/666,776

(22) Filed: Sep. 21, 2000

(51) Int. Cl.$^7$ .................................................. F02B 33/44
(52) U.S. Cl. .............................. 60/612; 60/562; 60/564; 60/605.1; 60/605.2; 60/559.1; 416/198 A; 415/11
(58) Field of Search .................................. 60/612, 605.1, 60/605.2, 559.1; 923/562; 123/564; 415/11; 416/198 A

(56) References Cited

U.S. PATENT DOCUMENTS

| | | | |
|---|---|---|---|
| 2,189,106 | * | 2/1940 | Garve et al. ........................... 60/612 |
| 3,044,683 | | 7/1962 | Woollenweber, Jr. . |
| 4,122,679 | * | 10/1978 | Charron ............................. 123/559.1 |
| 4,807,150 | * | 2/1989 | Hobbs .................................... 415/11 |
| 4,930,315 | * | 6/1990 | Kanesaka ............................... 60/612 |
| 5,406,796 | * | 4/1995 | Hiereth et al. ....................... 60/605.2 |
| 5,526,645 | | 6/1996 | Kaiser . |
| 5,605,044 | | 2/1997 | Zimmer et al. . |
| 5,724,813 | | 3/1998 | Fenelon et al. . |
| 6,109,248 | * | 8/2000 | Nilsson .............................. 123/559.1 |
| 6,112,523 | * | 9/2000 | Kamo et al. ........................... 60/612 |

FOREIGN PATENT DOCUMENTS

| | | | | |
|---|---|---|---|---|
| 2 186 023-A | * | 8/1987 | (GB) | ...................................... 60/612 |
| 2-119627-A | * | 5/1990 | (JP) | ...................................... 123/562 |

* cited by examiner

Primary Examiner—Thomas Denion
Assistant Examiner—Thai-Ba Trieu
(74) Attorney, Agent, or Firm—Todd T. Taylor

(57) ABSTRACT

A turbocharger system for an internal combustion engine is provided with at least one rotatable shaft and a multi-stage compressor. The multi-stage compressor includes a first compressor wheel carried by a corresponding shaft, an axially extending first inlet associated with the first compressor wheel, a radially extending first outlet associated with the first compressor wheel, a second compressor wheel carried by a corresponding shaft, an axially extending second inlet associated with the second compressor wheel, and a radially extending second outlet associated with the second compressor wheel. An interstage duct fluidly interconnects in series the first outlet associated with the first compressor wheel with the second inlet associated with the second compressor wheel. At least one bypass duct is provided, with each bypass duct fluidly interconnecting the first outlet with the first inlet; the first outlet with an ambient environment; and/or the second outlet with the first outlet. At least one valve is provided, each valve being positioned within a corresponding bypass duct. A controller is coupled with each valve and selectively actuates each valve.

20 Claims, 1 Drawing Sheet

(m³/s)

TURBOCHARGER SYSTEM TO INHIBIT SURGE IN A MULTI-STAGE COMPRESSOR

TECHNICAL FIELD

The present invention relates to a turbocharger for use in an internal combustion engine, and, more particularly, to a turbocharger including a multi-stage compressor.

BACKGROUND ART

An internal combustion engine may include one or more turbochargers for compressing a fluid which is supplied to one or more combustion chambers within corresponding combustion cylinders. Each turbocharger typically includes a turbine driven by exhaust gases of the engine and a compressor which is driven by the turbine. The compressor receives the fluid to be compressed and supplies the fluid to the combustion chambers. The fluid which is compressed by the compressor may be in the form of combustion air or a fuel and air mixture.

The operating behavior of a compressor within a turbocharger may be graphically illustrated by a "compressor map" associated with the turbocharger in which the pressure ratio (compression outlet pressure divided by the inlet pressure) is plotted on the vertical axes and the flow is plotted on the horizontal axes. In general, the operating behavior of a compressor wheel is limited on the left side of the compressor map by a "surge line" and on the right side of the compressor map by a "choke line". The surge line basically represents "stalling" of the air flow at the compressor inlet. With too small a volume flow and too high a pressure ratio, the flow will separate from the suction side of the blades on the compressor wheel, with the result that the discharge process is interrupted. The air flow through the compressor is reversed until a stable pressure ratio by positive volumetric flow rate is established, the pressure builds up again and the cycle repeats. This flow instability continues at a substantially fixed frequency and the resulting behavior is known as "surging". The choke line represents the maximum centrifugal compressor volumetric flow rate, which is limited for instance by the cross-section at the compressor inlet. When the flow rate at the compressor inlet on other location reaches sonic velocity, no further flow rate increase is possible and choking results. Both surge and choking of a compressor should be avoided.

U.S. Pat. No. 3,044,683 (Woollenweber) discloses a fluid passage extending from the high pressure side of the compressor to the inlet side of a turbine. A spring loaded valve is disposed within the fluid passage and opens upon a high pressure condition within the compressor. The spring loaded valve thus merely acts to bypass some of the high pressure gas on an over pressure condition to the turbine of the turbocharger.

U.S. Pat. No. 5,724,813 (Fenelon et al.) assigned to the assignee of the present invention, discloses a turbocharger having a single stage compressor. A portion of the compressed gas from the single stage compressor may be recirculated to the outlet side of the turbine using controllably actuated valves. The control scheme utilizes only a single stage compressor.

The present invention is directed to overcoming one or more of the problems as set forth above.

DISCLOSURE OF THE INVENTION

In one aspect of the invention, a turbocharger system for an internal combustion engine is provided with at least one rotatable shaft and a multi-stage compressor. The multi-stage compressor includes a first compressor wheel carried by a corresponding shaft, an axially extending first inlet associated with the first compressor wheel, a radially extending first outlet associated with the first compressor wheel, a second compressor wheel carried by a corresponding shaft, an axially extending second inlet associated with the second compressor wheel, and a radially extending second outlet associated with the second compressor wheel. An interstage duct fluidly interconnects in series the first outlet associated with the first compressor wheel with the second inlet associated with the second compressor wheel. At least one bypass duct is provided, with each bypass duct fluidly interconnecting the first outlet with the first inlet; the first outlet with an ambient environment; and/or the second outlet with the first outlet. At least one valve is provided, each valve being positioned within a corresponding bypass duct. A controller is coupled with each valve and selectively actuates each valve.

In another aspect of the invention, an internal combustion engine is provided with an exhaust manifold, an intake manifold and a turbocharger. The turbocharger includes at least one rotatable shaft; a turbine having a turbine wheel carried by a corresponding shaft; and a multi-stage compressor. The multi-stage compressor includes a first compressor wheel carried by a corresponding shaft, an axially extending first inlet associated with the first compressor wheel, a radially extending first outlet associated with the first compressor wheel, a second compressor wheel carried by a corresponding shaft, an axially extending second inlet associated with the second compressor wheel, and a radially extending second outlet associated with the second compressor wheel. An interstage duct fluidly interconnects in series the first outlet associated with the first compressor wheel with the second inlet associated with the second compressor wheel. At least one bypass duct is provided, each bypass duct fluidly interconnecting the first outlet with the first inlet; the first outlet with an ambient environment; and/or the second outlet with the first outlet. At least one valve is provided, each valve being positioned within a corresponding bypass duct. A controller is coupled with each valve and selectively actuates each valve.

In yet another aspect of the invention, a method of operating a turbocharger in an internal combustion engine is provided with the steps of: providing an exhaust manifold; providing an intake manifold; providing a turbocharger including a turbine having a turbine wheel carried by a corresponding shaft; a multi-stage compressor including a first compressor wheel carried by a corresponding shaft, an axially extending first inlet associated with the first compressor wheel, a radially extending first outlet associated with the first compressor wheel, a second compressor wheel carried by a corresponding shaft, an axially extending second inlet associated with the second compressor wheel, and a radially extending second outlet associated with the second compressor wheel; and an interstage duct fluidly interconnecting in series the first outlet associated with the first compressor wheel with the second inlet associated with the second compressor wheel; fluidly interconnecting the first outlet with the first inlet; the first outlet with an ambient environment; and/or second outlet with the first outlet using at least one bypass duct; positioning at least one valve within each bypass duct; coupling each valve with a controller; and selectively actuating each valve using the controller.

BEST MODE FOR CARRYING OUT THE INVENTION

Figure 1:
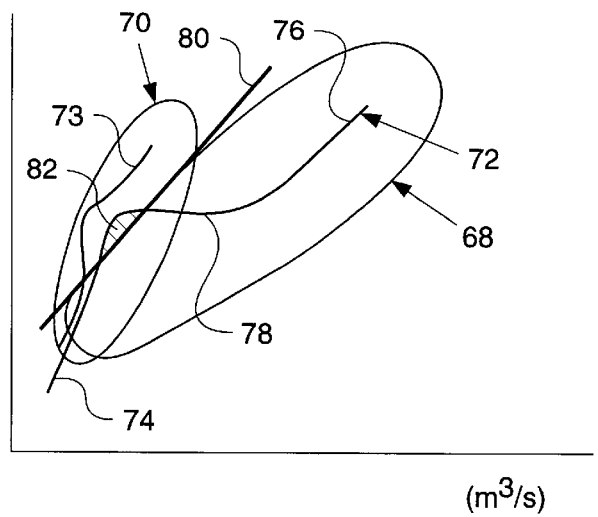
FIG. 1 is a graphical illustration of an operating map of an embodiment of a multi-stage compressor of the present invention.

Referring now to the drawings, and more particular to FIG. 1, there is shown an operating map for a multi-stage (i.e., two-stage) compressor 20 of turbocharger 12 shown in FIG. 2 and described in more detail hereinafter. Map 68 represents the operating behavior of first compressor wheel 32, and map 70 represents the operating behavior of second compressor wheel 34. Together, maps 68 and 70 combined with the engine air flow/pressure ratio characteristics define an operating curve 72 for the low pressure stage and 73 for the second stage of two-stage compressor 20.

In general, as the volumetric flow rate of turbocharger 12 increases as a result of increased shaft speed, the pressure ratio of turbocharger 12 likewise increases. A lower portion 74 of operating curve 72 corresponds to engine low speed conditions, and upper portion 76 corresponds to engine high speed conditions, and an intermediate portion 78 corresponds to a transition zone on operating curve 72 where the operating curve transitions from map 70 associated with compressor wheel 34 and map 68 associated with first compressor wheel 32.

Line 80 represents the surge line of two-stage compressor 20. It is preferable to maintain operating curve 72 to the right of surge line 80 at all times so that surge of two-stage compressor 20 does not occur. However, as shown by the cross-hatched area 82, a portion of operating curve 72 between lower portion 74 and intermediate portion 78 does move to the left of surge line 80, thus causing surge of two-stage compressor 20. Care must be taken to avoid surge within area 82 as operating curve 72 crosses surge line 80.

Figure 2:
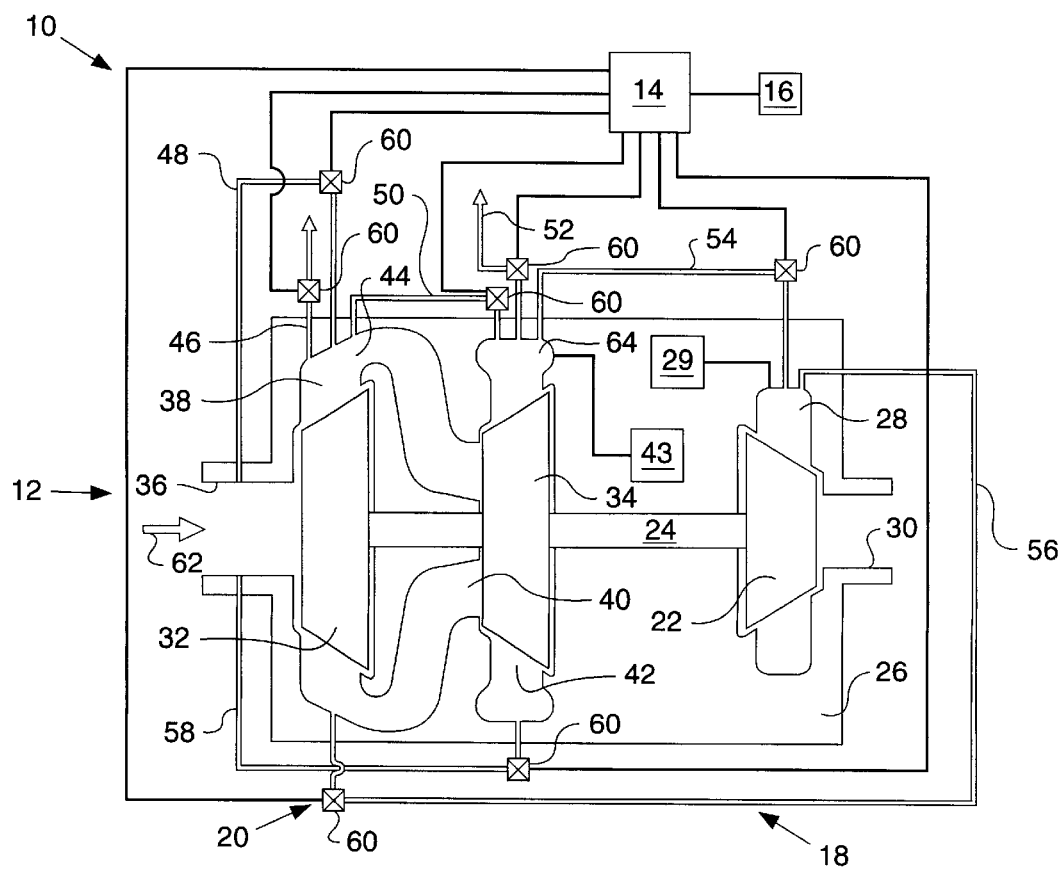
FIG. 2 is a simplified schematic illustration of an internal combustion engine including an embodiment of a turbocharger of the present invention.

Referring now to FIG. 2, there is shown an internal combustion engine 10 including an embodiment of a turbocharger 12 of the present invention. Internal combustion engine 10 also includes a controller 14 and a sensor 16.

Turbocharger 12 generally includes a turbine 18 and a two-stage compressor 20. Turbine 18 includes a turbine wheel 22 carried by a shaft 24, which in turn is rotatably carried by a housing 26. Turbine 18 includes an inlet 28 and an outlet 30, shown in simplified schematic form for purposes of illustration. Inlet 28 is fluidly coupled with an exhaust manifold 29 of internal combustion engine 10. Exhaust gas enters inlet 28 and rotatably drives turbine wheel 22 in known manner. Outlet 30 is fluidly coupled with a muffler system (not shown) of internal combustion engine 10 for discharging the exhaust gas to an ambient environment.

Multi-stage compressor 20 includes a first compressor wheel 32 and a second compressor wheel 34, each carried by common shaft 24. Multi-stage compressor 20 also includes an axially extending first inlet 36 associated with first compressor wheel 32, a radially extending first outlet 38 associated with first compressor wheel 32, an axially extending second inlet 40 associated with second compressor wheel 34 and a radially extending second outlet 42 associated with second compressor wheel 34. First compressor wheel 32 defines a first compressor stage; and second compressor wheel 34 defines a second compressor stage. Second outlet 42 is fluidly connected with intake manifold 43 of internal combustion engine 10.

First compressor wheel 32 and second compressor wheel 34 are fluidly coupled with each other via an interstage duct 44. More particularly, interstage duct 44 fluidly interconnects in series first outlet 38 associated with first compressor wheel 32 and second inlet 40 associated with second compressor wheel 34. Interstage duct 44 is shown in simplified schematic form in FIG. 2. The particular configuration of interstage duct 44 may vary from one application to another.

Turbocharger 12 also includes a plurality of bypass ducts 46, 48, 50, 52, 54, 56 and 58 which respectively fluidly interconnect selected portions of turbocharger 12, as will be described in more detail hereinafter. Each bypass duct 46–58 has a valve 60 positioned therein. Each valve 60 is electrically interconnected with controller 14, which selectively actuates each valve 60 depending upon an output signal received from one or more sensors 16, as will be described in further detail hereinafter.

Bypass duct 46 fluidly interconnects first outlet 48 with an ambient environment. Selective actuation of valve 60 disposed within bypass duct 46 discharges compressed air within interstage duct 44 to the ambient environment.

Bypass duct 48 fluidly interconnects interstage duct 44 with first inlet 36. Selective actuation of valve 60 disposed within bypass duct 48 recirculates a portion of the compressed air within interstage duct 44 to first inlet 36. Recirculation of the compressed air in this manner conserves energy when compared with discharging the compressed air to the ambient environment if gaseous fuel and air are mixed upstream of the compressor.

Bypass duct 50 fluidly interconnects second outlet 42 with first outlet 38 within interstage duct 44. Selective actuation of valve 60 within bypass duct 50 recirculates compressed air at second outlet 42 to interstage duct 44.

Bypass duct 52 fluidly interconnects second outlet 42 with the ambient environment. Selective actuation of valve 60 within bypass duct 52 discharges a portion of the compressed air within second outlet 42 to the ambient environment.

Bypass duct 54 fluidly interconnects turbine inlet 28 with second outlet 42 of multi-stage compressor 20. Selective actuation of valve 60 within bypass duct 54 causes a portion of the compressed air within second outlet 42 to be utilized as power for rotating turbine wheel 22.

Bypass duct 56 fluidly interconnects first outlet 38 of interstage duct 44 with turbine inlet 28. Selective actuation of valve 60 within bypass duct 56 utilizes a portion of the compressed air within interstage duct 44 for rotation of turbine wheel 22.

Bypass duct 58 fluidly interconnects second outlet 42 with first inlet 36. Selective actuation of valve 60 within bypass duct 58 recirculates compressed air at second outlet 42 to first inlet 36.

Sensor 16 senses one or more operating parameters associated with internal combustion engine 10 and/or turbocharger 12. In the embodiment shown, sensor 16 is in the form of a single sensor; however, multiple sensors may be utilized. Each sensor 16 senses at least one of:

engine speed;
fuel consumption rate;
ambient temperature;
air temperature at inlet 36;
air flow through multi-stage compressor 20;
temperature within interstage duct 44;
speed of shaft 24;
engine inlet manifold temperature;
engine inlet manifold pressure;

pressure at first outlet 38;

pressure at second outlet 42;

air pressure at inlet 36;

ratio of air to fuel in intake manifold 43; and/or oxygen in exhaust manifold 29. Of course, the exact placement location of sensor 16 within internal combustion engine 10 or turbocharger 12 will vary, dependent upon the specific operating parameter being sensed. For example, sensor 16 may be positioned adjacent to a crank shaft (not shown) of internal combustion engine 10 for sensing the engine speed; or may be positioned within first inlet 36, interstage duct 44 or second outlet 42 for sensing air flow through multi-stage compressor 20. If configured to sense air flow, sensor 16 may be configured as a hot wire annemometer.

Controller 14 may further process the one or more output signals received from sensor(s) 16 for actuation of a selected valve 60. For example, a first sensor 16 may be utilized to sense a pressure within first outlet 38 and a second sensor 16 may be utilized to sense a pressure within second outlet 42. Controller 14 may further process the output signals, e.g., by calculating a ratio between the pressure at first outlet 38 and the pressure at second outlet 42.

In the embodiment shown in FIG. 2, first compressor wheel 32 and second compressor wheel 34 are each forward facing with respect to turbine wheel 22. That is, each of first compressor wheel 32 and second compressor wheel 34 face in a direction away from turbine wheel 22.

INDUSTRIAL APPLICABILITY

During use, exhaust gas flows from exhaust manifold 29 to turbine inlet 28. The exhaust gas rotatably drives turbine wheel 22 which in turn drives common shaft 24 carrying each of first compressor wheel 32 and second compressor wheel 34. Combustion air (or gaseous fuel) enters multi-stage compressor 20 at first inlet 36, as indicated by arrow 62. First compressor wheel 32 accelerates and compresses the air flow to first outlet 38. The compressed air flows through interstage duct 44 to second inlet 40 associated with second compressor wheel 34. Second compressor wheel 34 accelerates and compresses the air to second outlet 42. The air then flows to a volute 64 and then to intake manifold 43. During operation of multi-stage compressor 20, controller 14 senses one or more operating parameters associated with turbocharger 12 and/or internal combustion engine 10 and actuates a selected valve 60. The operating parameters sensed indicates whether first compressor wheel 32 and/or second compressor wheel 34 are approaching or are at a surge condition. Recirculating a portion of the compressed air and/or venting the compressed air to the ambient environment causes a rapid increase in volumetric flow rate to multi-stage compressor and a decrease in pressure at the vent location associated with the selectively actuated valve 60, thereby almost instantaneously moving the operating curve 72 of multi-stage compressor 20 shown in FIG. 1 down and to the right away from the surge line. If a surge condition is sensed in association with first compressor wheel 32, preferably compressed air (or gaseous fuel) at first outlet 38 is recirculated to first inlet 36 via bypass duct 48, or the compressed air is vented to the ambient environment via bypass duct 46. If a surge condition is sensed in association with second compressor 34, preferably the compressed air at second outlet 42 is recirculated to first inlet 36 via bypass duct 58. Recirculating the compressed air at either first outlet 38 or second outlet 42 to first inlet 36 conserves energy by re-utilizing the compressed air within multi-stage compressor 20.

The turbocharger system of the present invention, including turbocharger 12 and controller 14, senses a surge condition associated with first compressor wheel 32 and/or second compressor wheel 34 and selectively actuates a valve to discharge compressed air and thereby prevent a surge condition. The compressed air is preferably recirculated and reused to conserve energy. By providing a multi-stage compressor with multiple recirculation and/or vent fluid passageways, surge within multi-stage compressor 20 may be effectively prevented.

Other aspects, objects and advantages of this invention can be obtained from a study of the drawings, the disclosure and the appended claims.

What is claimed is:

1. A turbocharger system for an internal combustion engine, comprising:

at least one rotatable shaft;

a multi-stage compressor including a first compressor wheel carried by a corresponding said shaft, a first inlet associated with said first compressor wheel, a radially extending first outlet associated with said first compressor wheel, a second compressor wheel carried by a corresponding said shaft, a second inlet associated with said second compressor wheel, and a radially extending second outlet associated with said second compressor wheel;

an interstage duct fluidly interconnecting in series said first outlet associated with said first compressor wheel with said second inlet associated with said second compressor wheel;

at least one bypass duct, each said bypass duct fluidly interconnecting at least one of:

said first outlet with said first inlet;

said first outlet with an ambient environment; and said second outlet with said first outlet;

at least one valve, each said valve positioned within a corresponding said bypass duct; and a controller coupled with each said valve, said controller selectively actuating each said valve.

2. The turbocharger of claim 1, including at least one sensor, each said sensor sensing an operating parameter and providing an output signal, said controller receiving said output signal from each said sensor and selectively actuating each said valve dependent upon at least one said output signal.

3. The turbocharger of claim 2, wherein each said sensor senses a corresponding one of:

air flow through said multi-stage compressor;

air temperature at an inlet to turbocharger;

temperature within said interstage duct;

speed of said shaft;

pressure at said first outlet;

pressure at said second outlet; and air pressure at an inlet to said compressor.

4. The turbocharger of claim 3, wherein each said sensor senses a ratio between two of said pressure at said first outlet; said pressure at said second outlet; and said barometric pressure.

5. The turbocharger of claim 2, wherein at least one said sensor is a hot wire annemometer.

6. The turbocharger of claim 1, including a turbine having a turbine wheel carried by said shaft, an inlet and an outlet, said bypass duct further interconnecting one of:

said second outlet with said first inlet;

said second outlet with an ambient environment;

said first outlet with said turbine inlet; and said second outlet with said turbine inlet.

7. The turbocharger of claim 1, wherein said at least one shaft is a single shaft, each of said first compressor wheel and said second compressor wheel being carried by said single shaft.

8. The turbocharger of claim 7, wherein each of said first compressor wheel and said second compressor wheel face in a common direction.

9. The turbocharger of claim 8, wherein each of said first compressor wheel and said second compressor wheel face in a common direction away from said turbine.

10. The turbocharger of claim 1, wherein said at least one valve includes a single valve positioned within each said bypass duct.

11. An internal combustion engine, comprising:

an exhaust manifold;

an intake manifold; and a turbocharger including:
  at least one rotatable shaft;
  a turbine having a turbine wheel carried by a corresponding said shaft;
  a multi-stage compressor including a first compressor wheel carried by a corresponding said shaft, a first inlet associated with said first compressor wheel, a radially extending first outlet associated with said first compressor wheel, a second compressor wheel carried by a corresponding said shaft, a second inlet associated with said second compressor wheel, and a radially extending second outlet associated with said second compressor wheel;
  an interstage duct fluidly interconnecting in series said first outlet associated with said first compressor wheel with said second inlet associated with said second compressor wheel;
  at least one bypass duct, each said bypass duct fluidly interconnecting at least one of:
    said first outlet with said first inlet;
    said first outlet with an ambient environment; and
    said second outlet with said first outlet;
  at least one valve, each said valve positioned within a corresponding said bypass duct; and
  a controller coupled with each said valve, said controller selectively actuating each said valve.

12. The internal combustion engine of claim 11, including at least one sensor, each said sensor sensing an operating parameter and providing an output signal, said controller receiving said output signal from each said sensor and selectively actuating each said valve dependent upon at least one said output signal.

13. The internal combustion engine of claim 12, wherein each said sensor senses an associated one of:

engine speed;

fuel consumption rate;

ambient temperature;

air flow through said multi-stage compressor;

temperature within said interstage duct;

speed of said shaft;

pressure at said first outlet;

pressure at said second outlet;

air pressure at an inlet to said compressor;

pressure within said intake manifold;

pressure within said exhaust manifold;

ratio of air to fuel in said intake manifold; and oxygen in said exhaust manifold.

14. The internal combustion engine of claim 13, wherein each said sensor senses a ratio between two of said pressure at said first outlet; said pressure at said second outlet; and said barometric pressure.

15. The internal combustion engine of claim 12, wherein at least one said sensor is a hot wire annemometer.

16. The internal combustion engine of claim 11, wherein said turbine includes an inlet and an outlet, said bypass duct further interconnecting one of:

said second outlet with said first inlet;

said second outlet with an ambient environment;

said first outlet with said turbine inlet; and said second outlet with said turbine inlet.

17. The internal combustion engine of claim 11, wherein said at least one shaft is a single shaft, each of said turbine wheel, said first compressor wheel and said second compressor wheel being carried by said single shaft.

18. The internal combustion engine of claim 17, wherein each of said first compressor wheel and said second compressor wheel face in a common direction.

19. The internal combustion engine of claim 18, wherein each of said first compressor wheel and said second compressor wheel face in a common direction away from said turbine.

20. A method of operating a turbocharger in an internal combustion engine, comprising the steps of:

providing an exhaust manifold;

providing an intake manifold;

providing a turbocharger including a turbine having a turbine wheel carried by a corresponding shaft; a multi-stage compressor including a first compressor wheel carried by a corresponding shaft, a first inlet associated with said first compressor wheel, a radially extending first outlet associated with said first compressor wheel, a second compressor wheel carried by a corresponding shaft, a second inlet associated with said second compressor wheel, and a radially extending second outlet associated with said second compressor wheel; and an interstage duct fluidly interconnecting in series said first outlet associated with said first compressor wheel with said second inlet associated with said second compressor wheel;

fluidly interconnecting at least one of said first outlet with said first inlet; said first outlet with an ambient environment; and said second outlet with said first outlet using at least one bypass duct;

positioning at least one valve within each said bypass duct;

coupling each said valve with a controller; and selectively actuating each said valve using said controller.

* * * * *